US012791826B2

(12) United States Patent
Iwasaki et al.

(10) Patent No.: US 12,791,826 B2
(45) Date of Patent: Nov. 10, 2026

(54) CAMERA DEVICE AND PORTABLE ELECTRONIC DEVICE INCLUDING THE SAME

(71) Applicant: AAC Optics Solutions Pte. Ltd., Singapore City (SG)

(72) Inventors: Takashi Iwasaki, Osaka (JP); Kazuo Shikama, Osaka (JP)

(73) Assignee: AAC Optics Solutions Pte. Ltd., Singapore City (SG)

( * ) Notice: Subject to any disclaimer, the term of this patent is extended or adjusted under 35 U.S.C. 154(b) by 291 days.

(21) Appl. No.: 18/399,751

(22) Filed: Dec. 29, 2023

(65) Prior Publication Data

US 2025/0067955 A1 Feb. 27, 2025

(30) Foreign Application Priority Data

Aug. 22, 2023 (JP) ................................ 2023-134562

(51) Int. Cl.
*G02B 7/10* (2021.01)
*G03B 3/10* (2021.01)

(52) U.S. Cl.
CPC ................ *G02B 7/10* (2013.01); *G03B 3/10* (2013.01)

(58) Field of Classification Search
CPC .... G02B 7/10; G03B 3/10; G03B 2205/0069; G03B 5/00; G03B 30/00
See application file for complete search history.

(56) References Cited

U.S. PATENT DOCUMENTS 6,064,827 A * 5/2000 Toyoda .................... G03B 5/00 396/55
2012/0154912 A1* 6/2012 Shihoh .................. G02B 27/64 359/554
2018/0173080 A1* 6/2018 Enta ....................... H04N 23/57
2020/0073202 A1* 3/2020 Noguchi ............ H04N 23/6812
2022/0070379 A1* 3/2022 Wade ....................... G02B 7/08
2022/0252826 A1* 8/2022 Seo ........................ G03B 30/00

FOREIGN PATENT DOCUMENTS

JP 2012145661 A * 8/2012
JP 2015011277 A * 1/2015
KR 20200047473 A * 5/2020 ............... H02K 5/24

* cited by examiner

*Primary Examiner* — William R Alexander
*Assistant Examiner* — Mackenzi Bourquine
(74) *Attorney, Agent, or Firm* — Wiersch Law Group

(57) ABSTRACT

The camera device includes a base, a lens unit having an optical axis, a camera element unit, a first movable frame, a second movable frame, multiple first balls, multiple second balls, a first drive mechanism, and a second drive mechanism. The first movable frame is supported on the base by the multiple first balls. The first drive mechanism is configured to drive the first movable frame to rotate and/or move radially along the optical axis. The second movable frame is supported on the first movable frame by the multiple second balls, and the camera element unit is fixed to the second movable frame. The second drive mechanism is configured to drive the camera element unit to move along the optical axis and/or deflect along a direction perpendicular to the optical axis. The present application can achieve more efficient anti-shaking correction and autofocusing, and improve the quality of captured images.

15 Claims, 12 Drawing Sheets

CAMERA DEVICE AND PORTABLE ELECTRONIC DEVICE INCLUDING THE SAME

CROSS REFERENCE TO RELATED APPLICATIONS

The present application claims the benefit of priority under the Paris Convention to Japanese Patent Application No. 2023134562 filed on Aug. 22, 2023, which is incorporated herein by reference in its entirety.

TECHNICAL FIELD

The embodiments of the present application relate to the technical field of camera devices, in particular to a camera device and a portable electronic device including the same.

BACKGROUND

With the rapid development of photography technology, a camera device including a lens is widely applied to various portable electronic devices, such as a portable phone, a tablet, etc. A drive mechanism configured to drive the lens to move is widely applied to various camera devices.

In the related technologies, the drive mechanism generally includes a coil and a magnet, and the coil is fixed on the outer circumference of a lens frame. After the coil is energized to generate a magnetic field, the lens is driven by the electromagnetic force to move along an optical axis to achieve focusing function, and the lens can move on a plane perpendicular to the optical axis to achieve correction for hand shaking.

At present, in the case where an optical system has a longer optical axis length or a glass lens is used to improve the imaging quality of camera devices, sometimes the weight of the lens increases significantly. Therefore, in response to the lens being driven by the drive mechanism, in order to enable the drive mechanism to drive a heavy lens to move, it is necessary for the drive mechanism to provide a large driving force. In this way, the drive mechanism or camera device needs to develop towards a "large-scale" direction, which is inconsistent with the current "miniaturization" development direction of camera devices.

In addition, in the drive mechanism in the related technologies, the focus drive is arranged on the lens and the correction for hand shaking is arranged on the sensor, which makes it difficult to align the lens, the focus drive, and the correction drive for hand shaking during assembly, resulting in reduced optical performance.

Therefore, it is necessary to provide a camera device that develops towards miniaturization and simplifies the alignment of the optical axis during assembly.

SUMMARY

An objective of the present application is to provide a camera device and a portable electronic device to solve the technical problems in the related technologies, which can reduce the occupied space and simplify the alignment of the optical axis during assembly.

In a first aspect, camera device is provided according to the present application, and the camera device includes a casing having an accommodating cavity, a base fixed to the casing, a lens unit having an optical axis and fixed to the casing, and a camera element unit arranged in the casing, a first movable frame, a second movable frame, multiple first balls, multiple second balls, a first drive mechanism, and a second drive mechanism;

where a first through groove is formed on the first movable frame along the optical axis, and the first movable frame is supported on the base by the multiple first balls;

where the second movable frame is supported on the first movable frame by the multiple second balls, and a second through groove is formed on the second movable frame along the optical axis, a first annular protrusion protruding from an inner wall of the second through groove is formed at a backlight side along the optical axis, the first annular protrusion extends at least partially into the first through groove, and the camera element unit is fixed to the first annular protrusion and arranged opposite to the second through groove along the optical axis;

where the first drive mechanism is configured to drive the first movable frame to move to enable the second movable frame and the camera element unit to rotate along the optical axis as a centerline and/or move in a plane perpendicular to the optical axis, and the second drive mechanism is configured to drive the second movable frame to move to enable the camera element unit to move along the optical axis and/or deflect along a direction perpendicular to the optical axis.

As an improvement, the first drive mechanism includes a first magnet fixed on the first movable frame and a first coil arranged on the base and opposite to the first magnet, the second drive mechanism includes a second coil arranged on the second movable frame and opposite to the first magnet, there are multiple first magnets, multiple first coils, multiple second coils, and the multiple first magnets are in a one-to-one correspondence to the multiple first coils and the multiple second coils.

As an improvement, the first drive mechanism further includes multiple first yokes and a first circuit board arranged on the base, the multiple first coils and the multiple first yokes are both arranged on the first circuit board, and the multiple first coils are in a one-to-one correspondence to the multiple first yokes;

where the second drive mechanism further includes multiple second yokes and a second circuit board arranged on the second movable frame, the second coil and the multiple second yokes are both arranged on the second circuit board, and the multiple second coils are in a one-to-one correspondence to the multiple second yokes.

As an improvement, the multiple first coils include four first coils symmetrically distributed with the optical axis as a centerline, and two adjacent first coils are arranged orthogonally to each other;

where the multiple second coils include four second coils symmetrically distributed with the optical axis as a centerline, and two adjacent second coils are arranged orthogonally to each other.

As an improvement, both the multiple first coils and the multiple second coils are runway shaped coils, and the camera device further includes a position sensor arranged within the multiple first coils and the multiple second coils.

As an improvement, the second movable frame has multiple guide grooves at the backlight side along the optical axis, an extending angel of a respective guide groove in the multiple guide grooves forms a preset angle with a plane perpendicular to the optical axis, the multiple guide grooves are in a one-to-one correspondence to the multiple second balls, an end of each respective of second ball close to the second movable frame extends into the respective guide groove in the multiple guide grooves and is in a rolling connection to the second movable frame, and an end of each respective of second ball close to the first movable frame is a rolling connection to the first movable frame.

As an improvement, the second ball includes magnetic material.

As an improvement, the base is provided with a first groove on a light receiving side along the optical axis, the first movable frame is provided with a second groove on the backlight side along the optical axis, the first groove has a first plate body, the second groove has a second plate body, and the multiple first balls are at least partially accommodated in the first groove and arranged between the first plate body and the second plate body.

As an improvement, there are multiple first shock absorbers between the first movable frame and the base, and multiple first shock absorbers are arranged at intervals in a circle on the base;

where there are multiple second shock absorbers arranged between an outer wall surface of the first annular protrusion and an inner wall surface of the first through groove, and the multiple second shock absorbers are arranged at intervals in a circle within the first through groove.

As an improvement, a flexible conductive substrate is arranged in the accommodating cavity, the flexible conductive substrate is a plate structure with at least two bends or a plate spring shaped structure that can be driven in a plane perpendicular to the optical axis, the accommodating cavity has space for curved surfaces of the flexible conductive substrate to pass, one end of the flexible conductive substrate is connected to the camera element unit, and the other end of the flexible conductive substrate is fixed to the base and at least partially extends outside the accommodating cavity.

As an improvement, the camera element unit includes an optical filter and an image sensor arranged sequentially along a light incident direction, both the optical filter and the image sensor are fixed in a mounting base, and the mounting base is integrally formed with the second movable frame.

As an improvement, the first movable frame is configured to extend at the backlight side along the optical axis to form a cylinder, the cylinder has an inner wall surface flushed with the outer wall surface of the first annular protrusion, and a first position-limiting ring protrudes from the inner wall surface of the cylinder to the first annular protrusion;

where the outer wall surface of the first annular protrusion is provided with a second position-limiting ring protruding to the cylinder;

where the multiple second balls are movably arranged between the first position-limiting ring and the second position-limiting ring, and are in a rolling connection to the inner wall surface of the cylinder and the outer wall surface of the first annular protrusion.

As an improvement, the first movable frame has an accommodating groove at a light receiving side along the optical axis, a predetermined angle is formed between an extending direction of an inner wall surface on one side of the accommodating groove and the optical axis, the second movable frame has a protrusion block formed opposite to the accommodating groove, and the protrusion block extends along the optical axis to the first movable frame;

an end of each respective second ball in the multiple second balls close to the first movable frame is configured to extend into the accommodating groove and is in a rolling connection to the first movable frame, and an end of each respective second ball in the multiple second balls close to the second movable frame is in a rolling connection to the protrusion block.

As an improvement, the lens unit is a zoom lens structure or a periscope lens structure.

As an improvement, the lens unit further includes an aperture structure configured to optically control an amount of light.

In a second aspect, a portable electronic device is further provided according to the present application, and the portable electronic device includes the camera device according to any one above.

Compared with the related technologies, in the camera device of the present application, the first drive mechanism is used to drive the first movable frame and drive the second movable frame and the camera element unit to perform correction for hand shaking, and the second drive mechanism is used to drive the second movable frame and drive the camera element unit to perform focusing adjustment and/or correction for hand shaking, thereby achieving optical anti-shaking and automatic focusing along all six axis direction only by moving the camera element unit, which is conducive to achieving miniaturization of the camera device. In addition, the lens unit is fixed, and the camera element unit is arranged on the second movable frame, so that the optical alignment on the existing anti-shaking correction component and the possible secondary optical offset from the optical alignment with the lens unit can be limited to a point where the anti-shaking correction component is aligned with the fixed lens unit. Therefore, the optical axis alignment during the assembly of the camera device becomes simpler, which minimizes the reduction of optical performance.

By fixing the lens unit, the lens unit will not lose control even when it falls, which causes the impact caused by the contact between the weighted lens unit and other components to disappear. The design difficulty of the impact countermeasure when the lens unit falls is reduced, and the alignment of the lens unit is also easier. It can also minimize the openings formed by the lens unit protruding over the electronic device such as a smartphone. Moreover, the action of correction for hand shaking and auto focusing in the present application is concentrated in the camera element unit, so that the camera element unit can be assembled with lens units with various different structures and drive methods.

The multiple first balls are used to support the first movable frame, and the multiple second balls are used to support the second movable frame, which avoids drive faults and effect on imaging performance caused by the deformation of an elastic component in response the elastic component being used to support the movable frame body in the existing structure, and eliminates unnecessary resonance modes of the elastic component and contribute to stable control of correction for hand shaking.

In summary, the camera device of the present application can achieve more efficient anti-shaking correction and autofocusing in a miniaturized portable electronic device, thereby improving the imaging quality.

Figure 1:
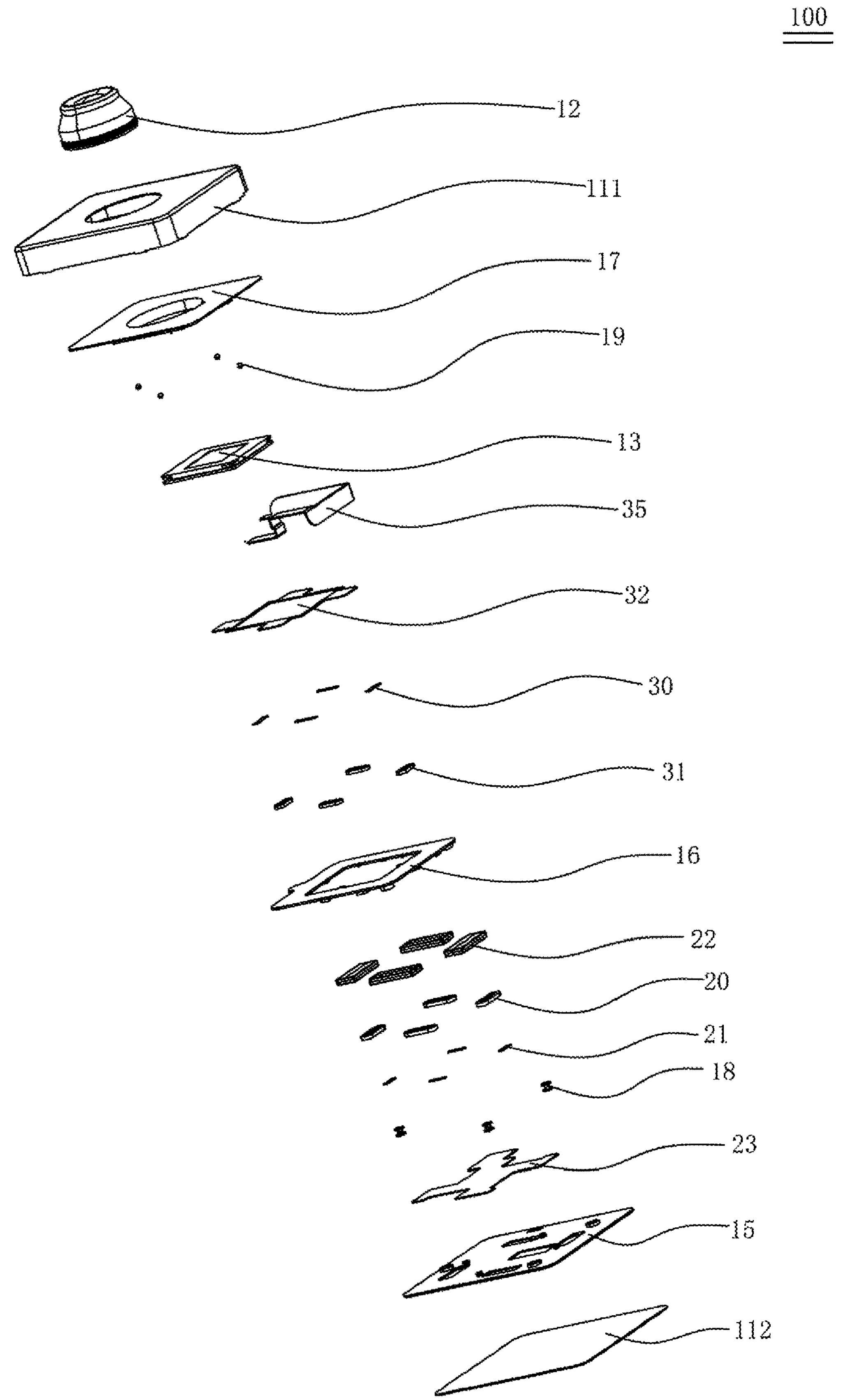
FIG. 1 is a three-dimensional exploded view of A camera device provided according to a first embodiment of the present application.
Figure 2:
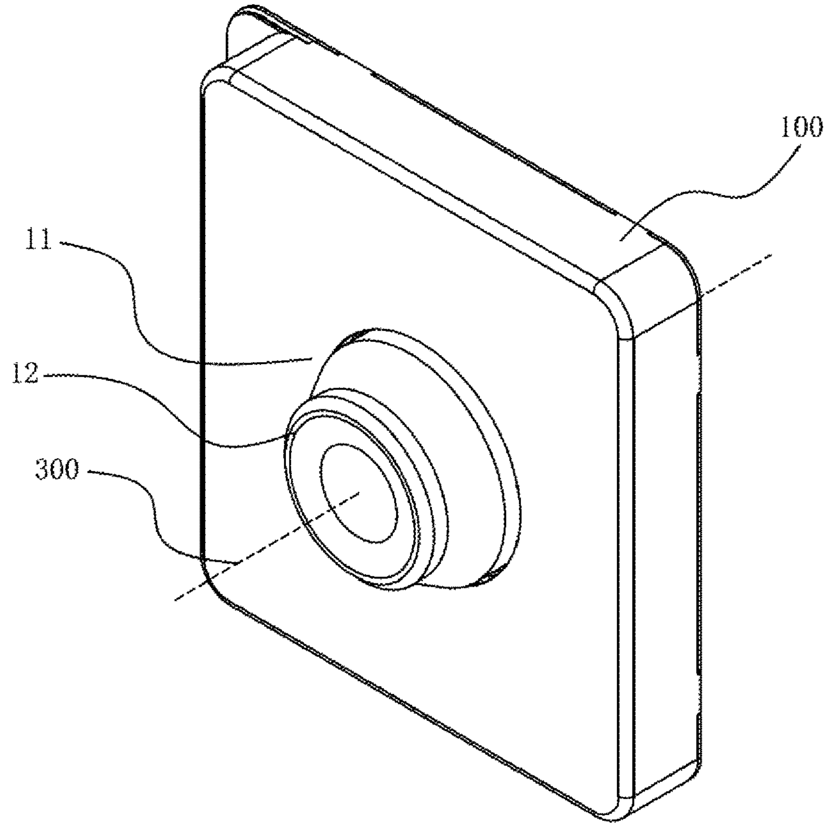
FIG. 2 is a three-dimensional view of the camera device provided according to the first embodiment of the present application.
Figure 3:
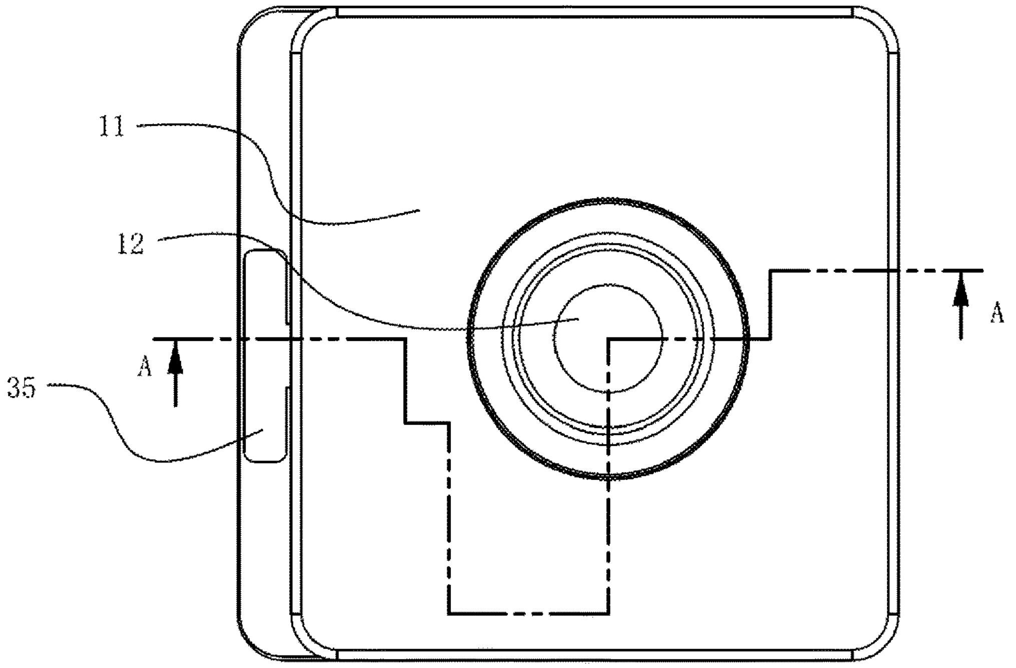
FIG. 3 is a top view of the camera device provided according to the first embodiment of the present application.

REFERENCE NUMERALS camera device 100, casing 11, accommodating cavity Ila, housing 111, base plate 112, through-hole 113, lens unit 12, optical filter 13, image sensor 14, base 15, first movable frame 16, first through groove 161, cylinder 162, first position-limiting ring 163, accommodating groove 164, magnetic adsorbing portion 165, second movable frame 17, second through groove 171, first annular protrusion 172, guide groove 173, second position-limiting ring 174, protrusion block 175, first ball 18, second ball 19, first coil 20, first yoke 21, first magnet 22, first circuit board 23, first groove 24, first plate body 25, second groove 26, second plate body 27, first shock absorber 28, second shock absorber 29, second yoke 30, second coil 31, second circuit board 32, first position detecting element 33, second position detecting element 34, flexible conductive substrate 35, mounting base 36, portable electronic device 200, optical axis 300, periscope lens structure 400, first prism 401, second prism 402, zoom lens structure 500.

DETAILED DESCRIPTION

The embodiments described below with reference to the accompanying drawings are exemplary and are only intended to explain the present application and cannot be interpreted as limitations on the present application.

First Embodiment

As shown in FIG. 1 to FIG. 19, a camera device 100 is provided according to embodiments of the present application, and the camera device 100 includes a casing 11 having an accommodating cavity 11*a*, a base 15 fixed to the casing 11, a lens unit 12 fixed to the casing 11 and having an optical axis 300, and an camera element unit 37 arranged in the accommodating cavity 11*a*, a first movable frame 16, a second movable frame 17, multiple first balls 18, multiple second balls 19, a first drive mechanism, and a second drive mechanism.

In a feasible embodiment, the casing 11 is a split type structure for easy assembly and maintenance. Specifically, the casing 11 includes a bottom plate 112 and a housing 111 configured to cover the bottom plate 112. The housing 111 is a box structure having an opening on the bottom, and the accommodating cavity 11*a* is formed by the housing 111 and the bottom plate 112. The housing 111 is provided with a through hole 113 in communication with the accommodating cavity 11*a*. The lens unit 12 is fixed inside the casing 11 by bonding, screws or other connection methods, and at least part of the lens units 12 protrudes from the through hole 113. Preferably, the lens unit 12 further includes an aperture structure that can control the amount of light optically. The camera element unit 37 has an optical axis 300, and the axis of the through hole 113 coincides with the optical axis 300.

The base 15 is fixed on the bottom wall surface of the accommodating cavity 11*a*, the first movable frame 16 has a first through groove 161 penetrating along the optical axis 300, and the first movable frame 16 is supported on the base 15 by multiple first balls in a rolling connection manner. The first movable frame 16 is arranged on the base 15 at a light receiving side along the optical axis 300. In a feasible embodiment, there are 3 first balls 18 arranged roughly equidistant in a circumferential direction of the optical axis 300, to improve the stability and reliability of the support.

The first drive mechanism is configured to drive the first movable frame 16 to move to drive the second movable frame 17 and the camera element unit 37 to rotate along the optical axis 300 as the centerline and/or move in a plane perpendicular to the optical axis 300. The first drive mechanism and the first movable frame 16 form an anti-shaking correction component. In response to the user holding the electronic device in hand for shooting, the shaking of the camera device 100 caused by hand shaking can be corrected in the three-axis direction.

The second movable frame 17 is supported on the first movable frame 16 by multiple second balls 19, and the second movable frame 17 has a second through groove 171 penetrating along the optical axis 300. In a feasible embodiment, there are 4 second balls 19 arranged roughly equidistant in a circumferential direction of the optical axis 300, to improve the stability and reliability of the support.

Figure 4:
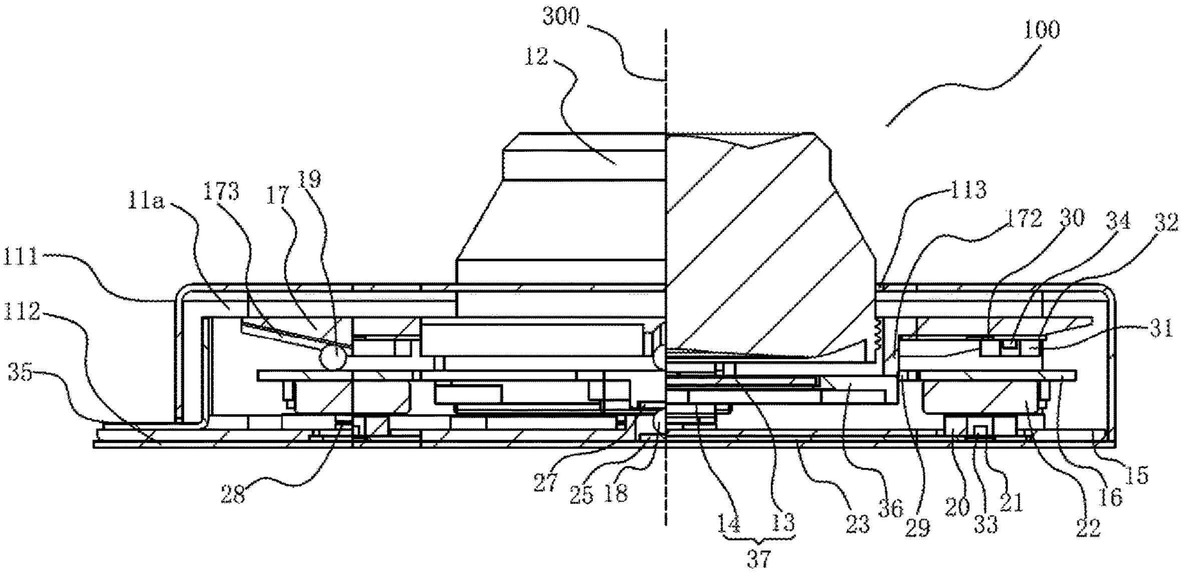
FIG. 4 is a cross-sectional view of the camera device shown in FIG. 3 along A-A.

As shown in FIG. 1 and FIG. 4, a first annular protrusion 172 is formed in the second through groove 171 at a backlight side along the optical axis 300, and the camera element unit 37 includes an optical filter 13 and an image sensor 14 arranged sequentially along the incident direction of the optical axis 300. The optical filter 13 and the image sensor 14 are fixed in the mounting base 36. Optionally, the mounting base 36 can be integrally formed at the bottom of the first annular protrusion 172. In some embodiments, the optical filter 13 is an infrared cutting filter 13, which typically protects the image sensor 14 and blocks harmful wavelengths, filters out unwanted light by passing through visible light.

The second drive mechanism is configured to drive the second movable frame 17 to move to drive the camera element unit 37 to move along the optical axis 300 and/or deflect in a direction perpendicular to the optical axis 300, which achieves automatic focusing of the camera device and anti-shaking in two axis directions.

In the present application, the first drive mechanism is used to drive the first movable frame 16 and drive the second movable frame 17 and the camera element unit 37 to perform correction for hand shaking, and the second drive mechanism is used to drive the second movable frame 17 and drive the camera element unit 37 to perform focusing adjustment and/or correction for hand shaking, thereby achieving optical anti-shaking and automatic focusing along all six axis direction only by moving the camera element unit 37, which is conducive to achieving miniaturization of the camera device. In addition, the lens unit is fixed, and the camera element unit 37 is arranged on the second movable frame 17, so that the optical alignment on the existing anti-shaking correction component and the possible secondary optical offset from the optical alignment with the lens unit can be limited to a point where the anti-shaking correction component is aligned with the fixed lens unit. Therefore, the optical axis alignment during the assembly of the camera device becomes simpler, which minimizes the reduction of optical performance.

By fixing the lens unit, the lens unit will not lose control even when it falls, which causes the impact caused by the contact between the weighted lens unit and other components to disappear. The design difficulty of the impact countermeasure when the lens unit falls is reduced, and the alignment of the lens unit is also easier. It can also minimize the openings formed by the lens unit protruding over the electronic device such as a smartphone. Moreover, the action of correction for hand shaking and auto focusing in the present application is concentrated in the camera element unit 37, so that the camera element unit 37 can be assembled with lens units with various different structures and drive methods.

The multiple first balls 18 are used to support the first movable frame 16, and the multiple second balls 19 are used to support the second movable frame 17, which avoids drive faults and effect on imaging performance caused by the deformation of an elastic component in response the elastic component being used to support the movable frame body in the existing structure, and eliminates unnecessary resonance modes of the elastic component and contribute to stable control of correction for hand shaking.

In the embodiments provided according to the present application, referring to FIG. 1 and FIG. 4, the first drive mechanism includes a first coil 20, a first yoke 21, a first magnet 22, and a first circuit board 23. The first circuit board 23 is arranged on the base 15, the first coil 20 and the first yoke 21 are arranged on the first circuit board 23. The first magnet 22 is arranged on the first movable frame 16, and there are multiple first magnets 22, multiple first coils 20, and multiple first yokes 21. The multiple first magnets 22 are in a one-to-one correspondence to the multiple first coils 20, and the multiple first yokes 21. The multiple first coils 20 are arranged between the multiple first magnets 22 and the multiple first yokes 21.

In response to the multiple first coils 20 being energized, a Lorentz force is generated in the multiple first coils 20 through the interaction between the magnetic field of the multiple first magnets 22 and the current flowing through the multiple first coils 20. The direction of the Lorentz force is orthogonal to the direction of the magnetic field of the multiple first magnets 22 and the direction of the current flowing through the multiple first coils 20. Due to the fixation of the first coil 20, the reaction force acts on the multiple first magnets 22. The reaction force becomes the driving force of the first movable frame 16, and the first movable frame 16 having the first magnet 22 moves in a plane orthogonal to the direction of the optical axis 300 or rotates around the optical axis 300, thereby performing anti-shaking correction.

The first coil 20 can change the translation or rotation direction of the first movable frame 16 by changing the direction of the current, so that the first movable frame 16 can perform translation, clockwise rotation, and counter-clockwise rotation in a plane perpendicular to the optical axis 300.

Figure 9:
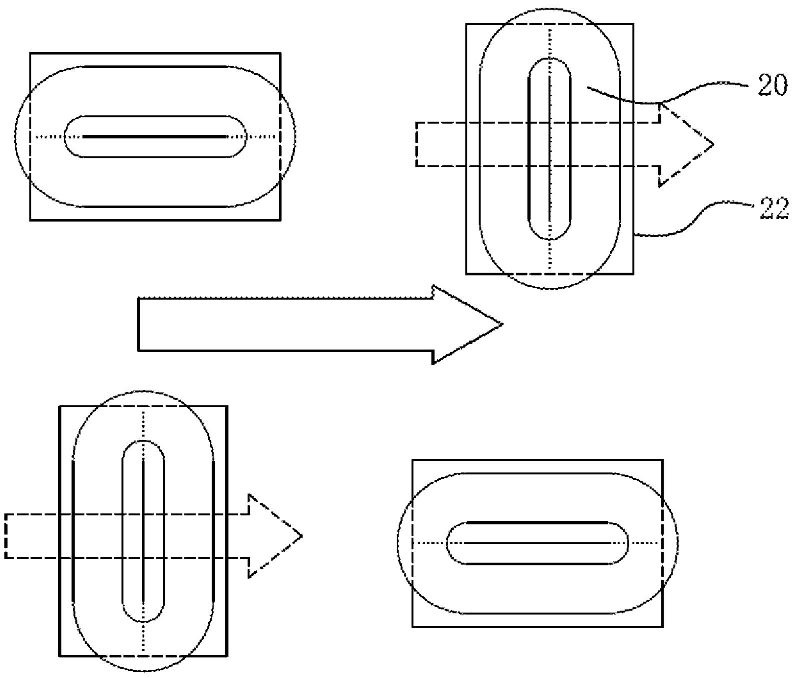
FIG. 9 is a top view in which a first coil and a first magnet provided according to the first embodiment of the present application are cooperate with each other to move along a direction perpendicular to an optical axis.
Figure 10:
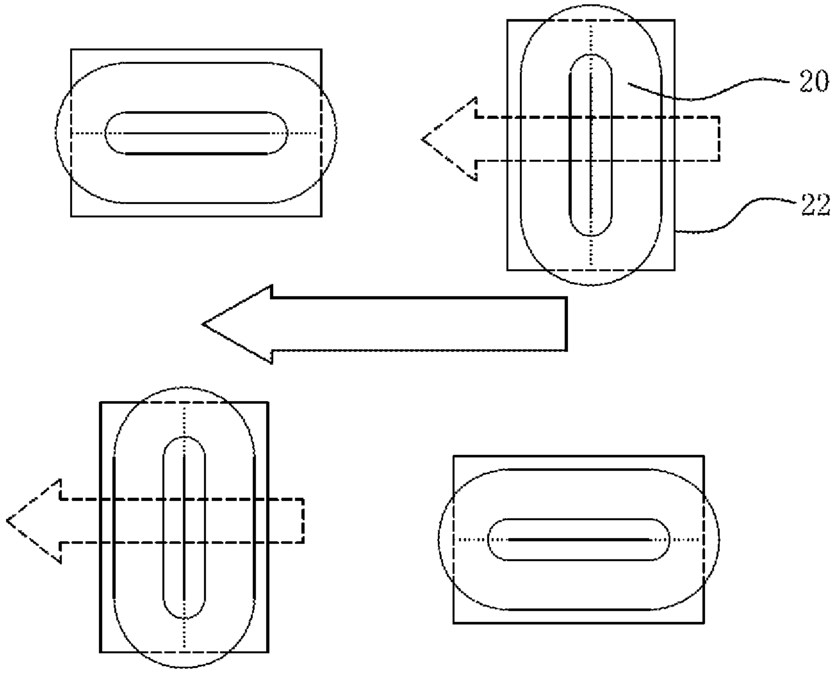
FIG. 10 is a top view in which the first coil and the first magnet provided according to the first embodiment of the present application are cooperate with each other to move along another direction perpendicular to the optical axis.
Figure 11:
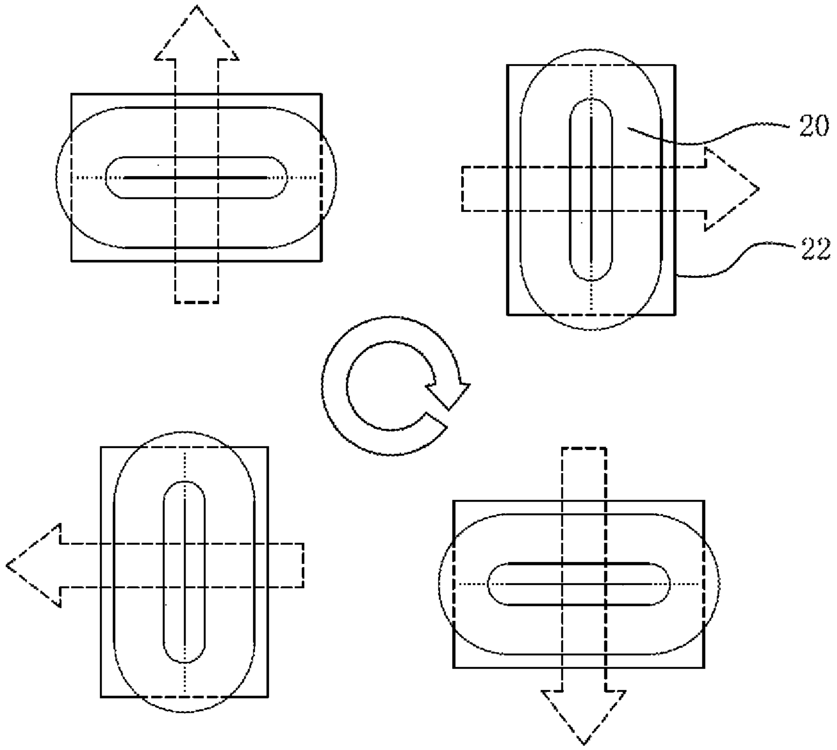
FIG. 11 is a top view in which the first coil and the first magnet provided according to the first embodiment of the present application are cooperate with each other to rotate along the optical axis as a centerline.

In a feasible embodiment, there are four first coils 20, as shown in FIG. 9 to FIG. 11. The four first coils 20 are symmetrically distributed around the optical axis 300, and are arranged on four sides of the square structure. The extending directions of adjacent first coils 20 are orthogonal, and the two first coils 20 arranged on the diagonal position are parallel, while the two first coils 20 on the same side are perpendicular to each other. Those of ordinary skills in the art can be aware that the first magnet 22 and the first yoke 21 corresponding to the first coil 20 are also four, all of which is in a one-to-one correspondence to the four first magnets 22 and the four first yokes 21.

As shown in FIG. 9, two first coils 20 at a diagonal position are energized, and the first coil 20 in the energized state is subjected to a corresponding force of the first magnet 22. However, the first coil 20 that is not energized is not subjected to the corresponding force of the first magnet 22, so that the first movable frame 16 can translate in a direction perpendicular to the optical axis 300. As shown in FIG. 10, at this time, the two first coils 20 at the other diagonal position are energized, If the other two first coils 20 are not energized, the first movable frame 16 can be moved in another direction perpendicular to the optical axis 300.

As shown in FIG. 11, currents with different directions are applied to the four first coils 20, and the force exerted on the four first magnets 22 causes the first movable frame 16 to rotate clockwise or counterclockwise.

In the embodiment provided according to the present application, the first yoke 21 is installed on the first circuit board 23 to form a structure that is pulled closer to the center of the first magnet 22, with a magnetic spring effect that always pulls the first movable frame 16 closer to the center of the optical axis 300 through the first yoke 21 and the first magnet 22. The first yoke 21 interacts with the first magnet 22, which achieves efficient loosening elimination, which can reduce the tilt of the first movable frame 16 relative to the optical axis 300, thereby playing a role in motion reset and compressing the first ball 18.

Figure 6:
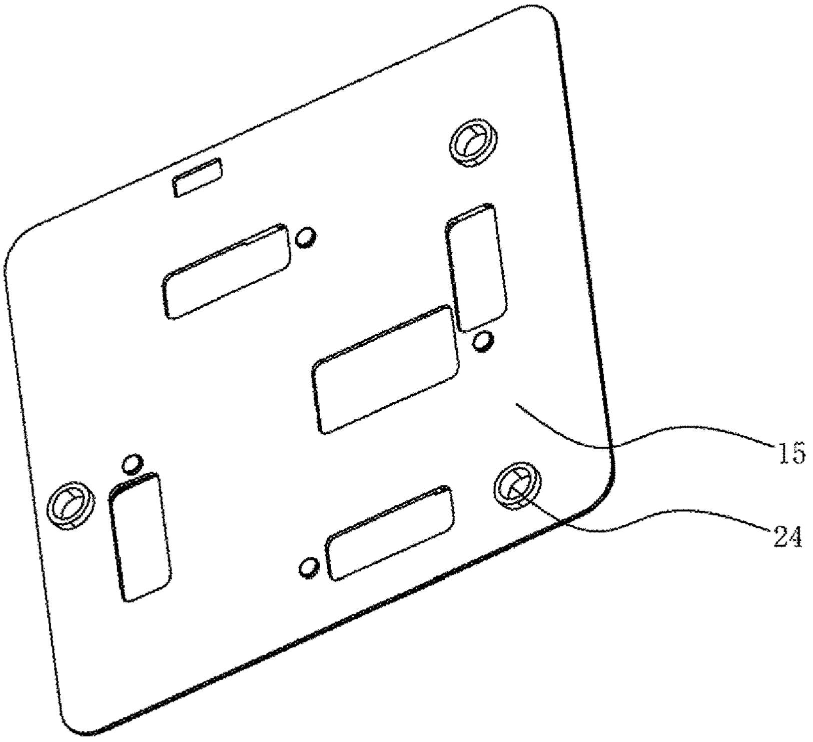
FIG. 6 is a three-dimensional view of a base provided according to the first embodiment of the present application.
Figure 7:
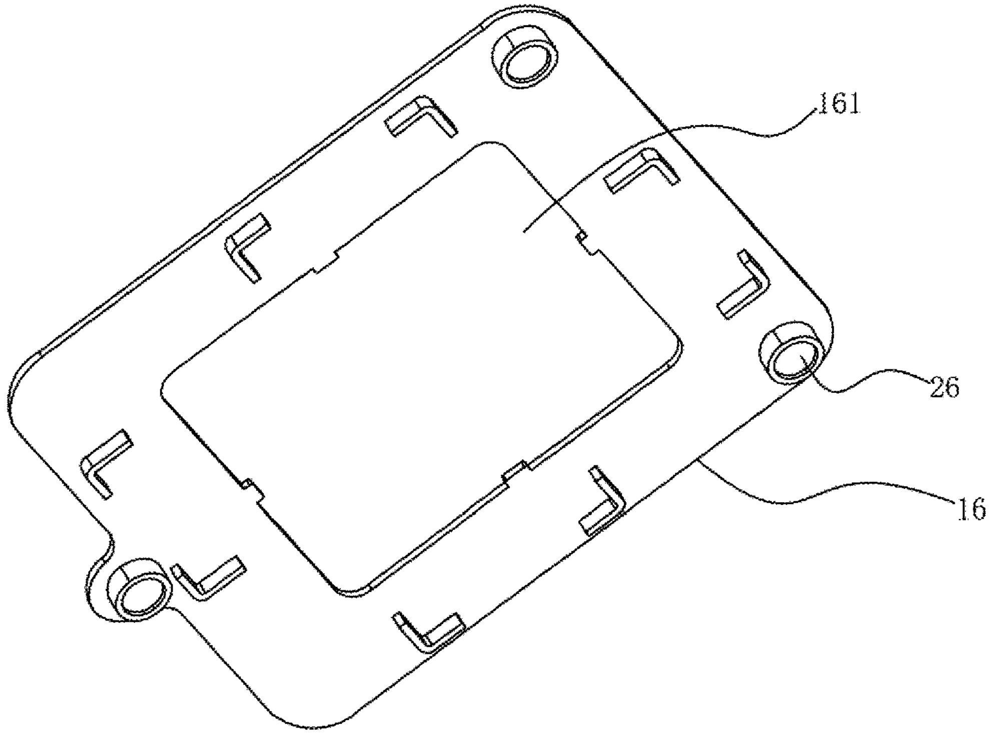
FIG. 7 is a three-dimensional view of a first movable frame provided according to the first embodiment of the present application.

Furthermore, as shown in FIG. 4, FIG. 6, and FIG. 7, the base 15 is provided with a first groove 24 on the light receiving side along the optical axis 300. The first movable frame 16 is provided with a second groove 26 on the backlight side along the optical axis 300. The first groove 24 is provided with a first plate body 25, and the second groove 26 is provided with a second plate body 27. The multiple first balls 18 are arranged between the first plate body 25 and the second plate body 27, and an end of each respective first ball 18 close to the base 15 extends into the first groove 24 and is connected to the first plate body 25 in a rolling manner. An end of each respective first ball 18 close to the first movable frame 16 extends into the second groove 26 and is connected to the second plate body 27 in a rolling manner, so that the first movable frame 16 can move back and forth on a plane orthogonal to the optical axis 300 or rotate around the optical axis 300. The multiple first plate bodies 25 are in one-to-one correspondence to the multiple second plate bodies 27, and the multiple first ball bodies 18, which provides a balanced and uniformly distributed support force, and prevent the first movable frame 16 from tilting during movement.

By accommodating the first ball 18 into the first groove 24 and the second groove 26, the movement of the first ball 18 can be limited to avoid excessive movement of the first movable frame 16. In addition, there is an overlap area between the projection of the first ball 18 in the orthogonal direction of the optical axis 300 and the base 15 and the first movable frame 16. The base 15, the first movable frame 16, and the first ball 18 can be overlapped along a thickness direction, which reduces the space occupied by the first ball 18, and is conducive to the miniaturization of the camera device 100 and improves protection against falling impacts.

In the embodiments provided according to the present application, as shown in FIG. 1 and FIG. 4, there are multiple first shock absorbers 28 between the first movable frame 16 and the base 15, and multiple first shock absorbers 28 are arranged in circular intervals on the base 15 to improve balanced and dispersed buffering and support effects. Those of ordinary skills in the art can know that the number and distribution of the first shock absorbers 28 can be determined according to actual situations, which will not be limited thereto. The first shock absorber 28 is preferably a shock absorbing gel, which can have a more accurate shock absorbing function by generating the shock absorption effect of the sudden power on control pulsation action for the shock absorbing correction component. In this embodiment, the first shock absorber 28 is arranged between the first magnet 22 and the base 15. As shown in FIG. 1, FIG. 4, and FIG. 7, the first annular protrusion 172 extends into the first through groove 161, and there are multiple second shock absorbers 29 between the outer wall of the first annular protrusion 172 and the inner wall of the first through groove 161. Multiple second shock absorbers 29 are arranged in circular intervals within the first through groove 161 to improve balanced and dispersed buffering and support effects. Those of ordinary skills in the art can know that the number and distribution of the second shock absorbers 29 can be determined according to actual situations, which will not be limited thereto. The first shock absorber 29 is preferably a shock absorbing gel, which can have a more accurate shock absorbing function by generating the shock absorption effect of the sudden power on control pulsation action for the second movable frame 17.

In the embodiment provided according to the present application, the second drive mechanism includes a second yoke 30, a second coil 31, and a second circuit board 32. The second circuit board 32 is arranged on the second movable frame 17, the first coil 20 and the second coil 31 are both runway shaped coils, the second coil 31 and the second yoke 30 are both arranged on the second circuit board 32. There are multiple second yokes 30 and multiple second coils 31. The multiple first magnets 22 are in a one-to-one correspondence to the multiple second coils 31 and multiple second yokes 30. Each respective second coil 31 is arranged between a respective first magnet 22 and a respective second yoke 30.

In response to the second coil 31 being energized, the interaction between the magnetic field of the first magnet 22 and the current flowing in the second coil 31 generates a Lorentz force in the second coil 31, which becomes the driving force of the second movable frame 17. The second movable frame 17 having the second coil 31 moves along the optical axis 300 or deflects in a direction perpendicular to the optical axis 300, thereby performing automatic focusing and correction for hand shaking.

The second coil 31 can change the direction of the current, to change the direction of movement of the second movable frame 17 along the optical axis 300 or the direction of the second movable frame 17 deflecting along the direction perpendicular to the optical axis 300.

Figure 12:
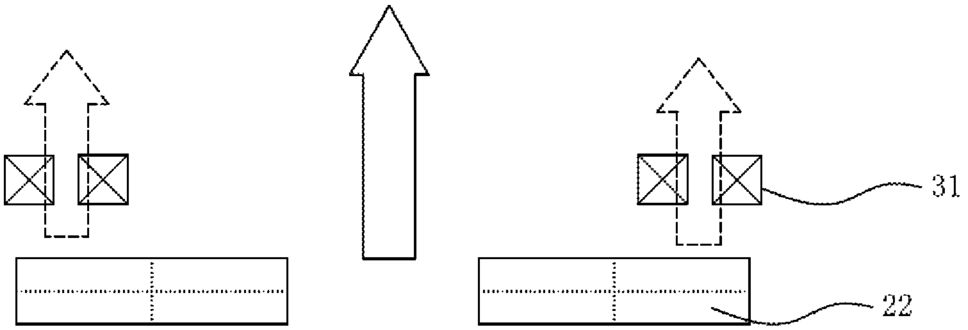
FIG. 12 is a schematic view in which a second coil and the first magnet provided according to the first embodiment of the present application are cooperate with each other to move along the optical axis.
Figure 13:
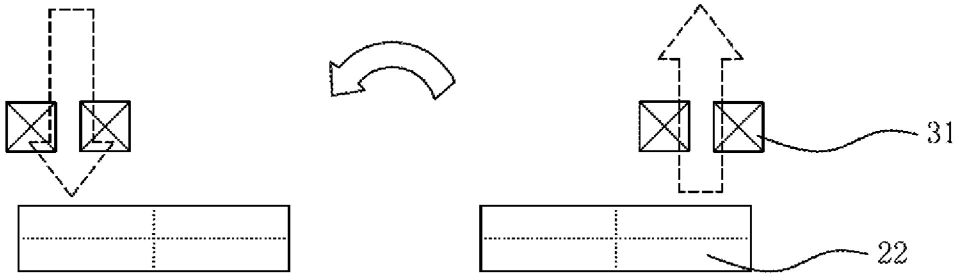
FIG. 13 is a schematic view in which the second coil and the first magnet provided according to the first embodiment of the present application are cooperate with each other to deflect along a direction perpendicular to the optical axis.

In a feasible embodiment, there are four second coils 31, as shown in FIG. 12 and FIG. 13. The four second coils 31 are symmetrically distributed around the axis of the optical axis 300, and are arranged on the four sides of the square structure. The extending directions of adjacent second coils 31 are orthogonal, and the two second coils 31 on the diagonal position are parallel, and the two second coils 31 on the same side are perpendicular to each other. Those of ordinary skills in the art can be aware that there are also four second yokes 30 corresponding to the second coils 31.

The first coils 20 and the second coils 31 can share the first magnet 22 for driving, so there is no need to install additional magnets or drive structures, which helps to achieve the miniaturization and easy assembly brought about by the significant reduction of components.

As shown in FIG. 12, in response to the second coils 31 being energized, the second coils 31 on both sides are subjected to a force in the same direction, which causes the second movable frame 17 on which the second coil 31 is arranged to ascend or descend along the optical axis 300.

As shown in FIG. 13, in response to the second coils 31 being energized, the second coils 31 on both sides are subjected to forces with opposite directions, which causes the second movable frame 17 on which the second coil 31 is arranged to deflect in a direction perpendicular to the optical axis 300 as the centerline.

Figure 8:
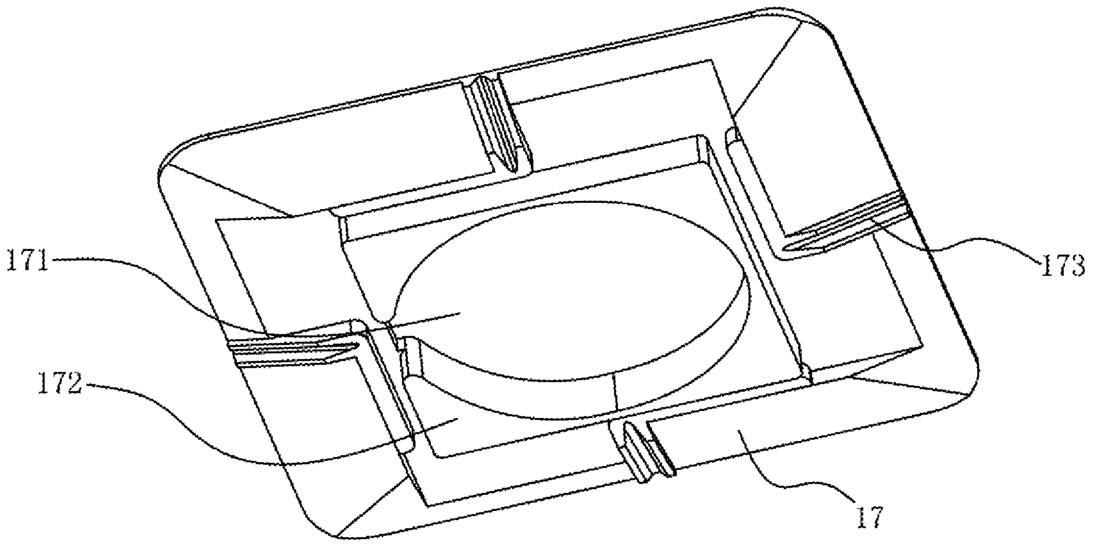
FIG. 8 is a three-dimensional view of a second movable frame provided according to the first embodiment of the present application.

Furthermore, as shown in FIG. 8, the second movable frame 17 is provided with a guide groove 173 on the backlight side along the optical axis 300. The extending direction of the guide groove 173 forms a preset angle with a plane perpendicular to the optical axis 300. An end of each respective second ball 19 close to the second movable frame 17 extends into the guide groove 173 and is connected to the second movable frame 17 in a rolling manner, and an end of each respective second ball 19 close to the first movable frame 16 is connected to the first movable frame 16 in a rolling manner, to facilitate the deflection of the second movable frame 17.

In a feasible embodiment, the second ball 19 includes magnetic material, and the first magnet 22 attracts the second yoke 30 arranged on the second movable frame 17 and the second ball 19 with magnetism. In summary, in response to the second movable frame 17 deflecting along the optical axis 300 and/or rotate around the direction perpendicular to the optical axis, the second ball 19 is forced to roll outward or inward by the guide groove 173 inclined to the second movable frame 17. However, due to the magnetism of the second ball 19, the attraction causes the second ball 19 to return to the center position of the first magnet 22, which provides a returning force for the movement of the second movable frame 17.

Furthermore, the base 15, the first movable frame 16, and the second movable frame 17 are magnetically attached to each other, but by deliberately adopting a structure that can be separated when impact is applied, the impact can be dispersed at a certain strength position of the component rather than concentrated on the first ball 18 and the second ball 19. Thus, it is possible to prevent the failure of the support components (e.g., first ball 18 and second ball 19) that become weak points of the movable structure (e.g., first movable frame 16 and second movable frame 17).

As a result, it is not possible to cause poor driving caused by damage to the support components, which is common in camera devices 100 in the market. In this structure, a safe structure that can be fully re driven even after the impact is applied can be achieved.

In some embodiments, the camera device 100 further includes a position sensor arranged within the first coils 20 and the second coils 31. Specifically, the position sensor includes a and a second position detecting element 34.

As shown in FIG. 1 and FIG. 4, the first position detecting element 33 configured to detect the magnetic flux of the first magnet 22 is arranged on the first circuit board 23. Preferably, there are at least three first position detecting elements 33. By detecting the magnetic flux of the first magnet 22, the correct position detecting and anti-shaking control of the first movable frame 16 can be carried out, which not only can detect the movement of the first movable frame 16 on a plane orthogonal to the optical axis 300, but also can detect a degree of the first movable frame 16 rotating relative to the optical axis 300, thereby enabling accurate position detecting and anti-shaking control.

Reference is continuously made to FIG. 1 and FIG. 4, the second position detecting element 34 configured to detect the magnetic flux of the first magnet 22 is arranged on the second circuit board 32. It is preferred that there are at least three second position detecting elements 34. By detecting the magnetic flux of the first magnet 22, it is possible to detect the position of the second movable frame 17 moving along the optical axis or rotating around the axis orthogonal to the optical axis 300, and detect the position during pitching and deflecting movements, which enables accurate position detecting and anti-shaking control.

Figure 5:
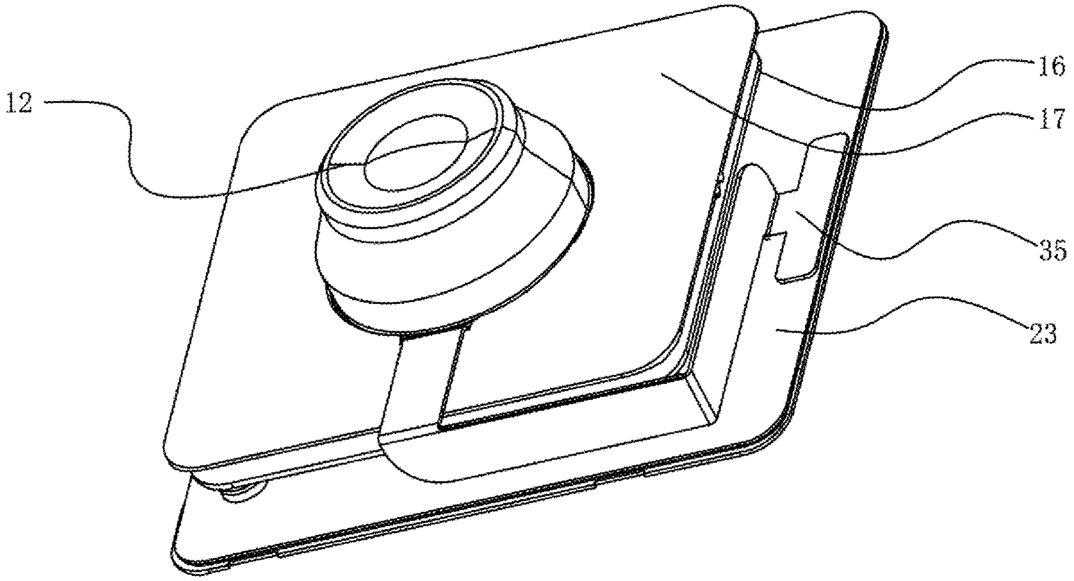
FIG. 5 is a top view of the camera device provided according to the first embodiment of the present application in response to some components being hided.

As shown in FIG. 5, the signal lines and power lines of the first coil 20, the first position detecting element 33, the second coil 31, and the second position detecting element 34 can be connected to the camera element unit 37 through the flexible conductive substrate 35 and wired to the outer side of the anti-shaking correction component and the focusing adjustment component, so as not to hinder the operation of the anti-shaking correction component and the focusing adjustment component. The flexible conductive substrate 35 is a board structure with at least two bends. One end of the flexible conductive substrate 35 is connected to the camera element unit 37, and the other end of the flexible conductive substrate 35 is fixed to the base 15 and extends at least partially to the outside of the accommodating cavity 11*a*. The accommodating cavity 11*a* is provided with a space for free movement, so that when the bending surface of the flexible conductive substrate 35 moves on the plane, it will not hinder movement. In addition, the flexible conductive substrate 35 may also have a plate spring shaped surface structure that can be driven in a plane direction perpendicular to the optical axis, such as the so-called “telescopic FPC”.

Figure 14:
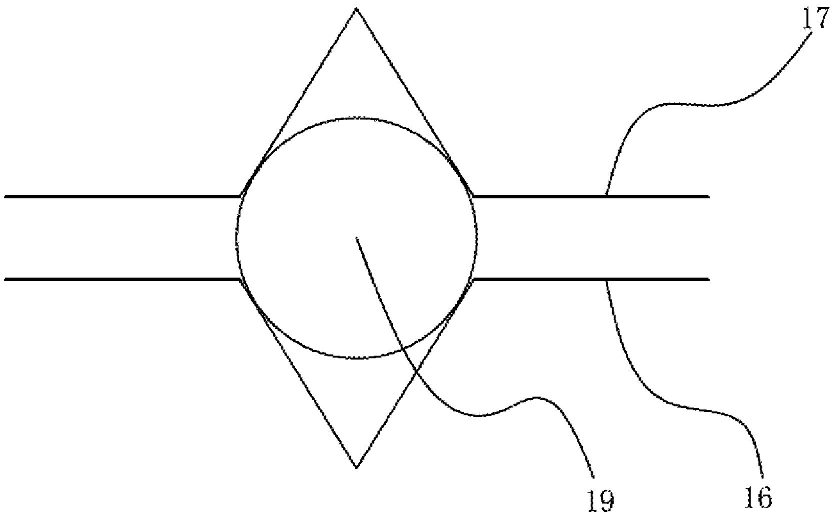
FIG. 14 is a schematic view of a first support structure of multiple second balls provided according to the first embodiment of the present application.

Optionally, the form of the guide groove for accommodating the second balls 19 can be designed according to specific needs, which will not limited thereto. For example, as shown in FIG. 14, there is a guide groove 173 at the corresponding positions of the first movable frame 16 and the second movable frame 17. The guide groove 173 is a V-shaped structure, and the two ends of the second ball 19 are connected to the two opposite guide grooves 173.

Figure 15:
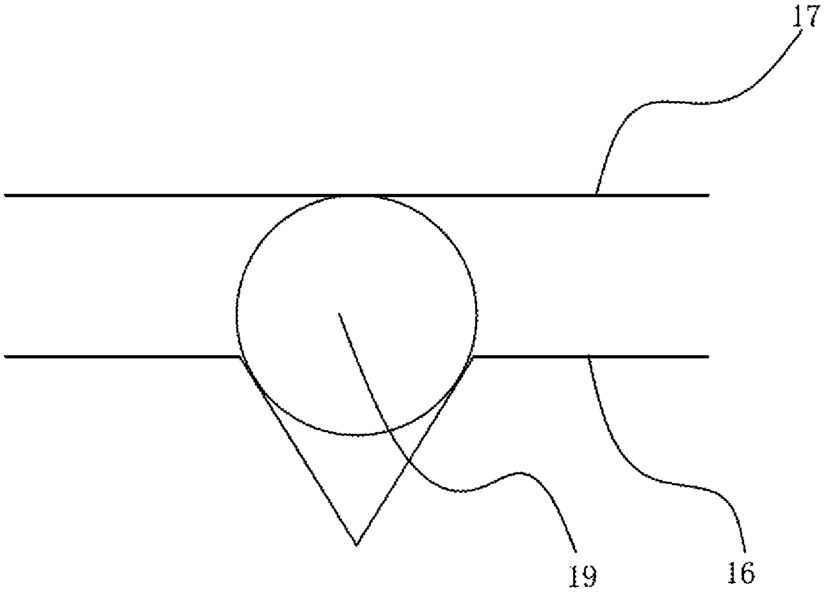
FIG. 15 is a schematic view of a second support structure of multiple second balls provided according to the first embodiment of the present application.

As shown in FIG. 15, there is a guide groove 173 on the first movable frame 16, which is a V-shaped structure. The second movable frame 17 is a plane. One end of the second ball 19 abuts against the guide groove 173, and the other end of the second ball 19 abuts against the second movable frame 17.

Figure 16:
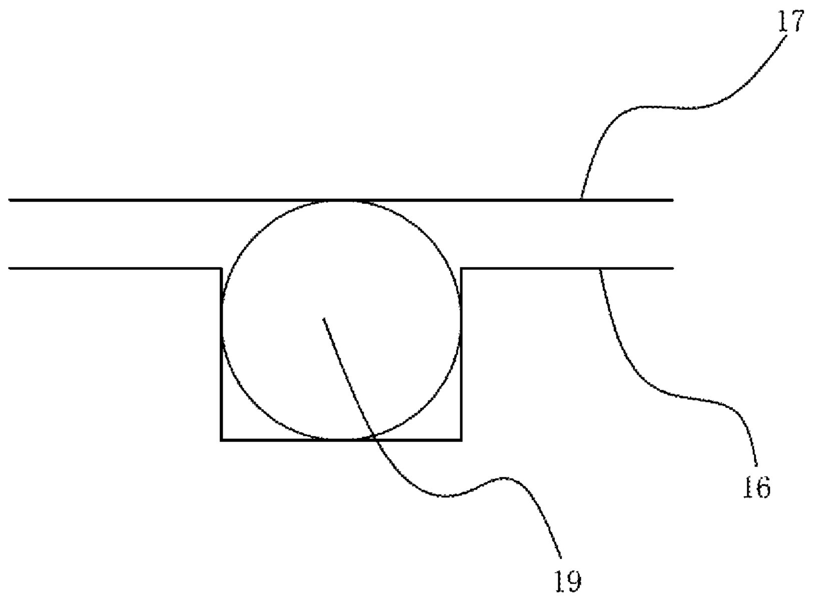
FIG. 16 is a schematic view of a third support structure of multiple second balls provided according to the first embodiment of the present application.

As shown in FIG. 16, there is a guide groove 173 on the first movable frame 16, which is a square groove. The second movable frame 17 is a plane. One end of the second ball 19 abuts against the guide groove 173, and the other end of the second ball 19 abuts against the second movable frame 17.

Figure 17:
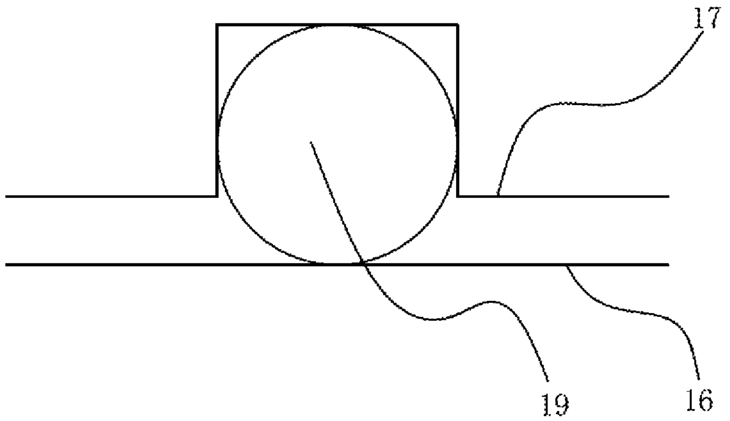
FIG. 17 is a schematic view of a fourth support structure of multiple second balls provided according to the first embodiment of the present application.

As shown in FIG. 17, there is a guide groove 173 on the second movable frame 17, which is a square groove. The first movable frame 16 is a plane. One end of the second ball 19 abuts against the guide groove 173, and the other end of the second ball 19 abuts against the first movable frame 16.

Second Embodiment

Figure 18:
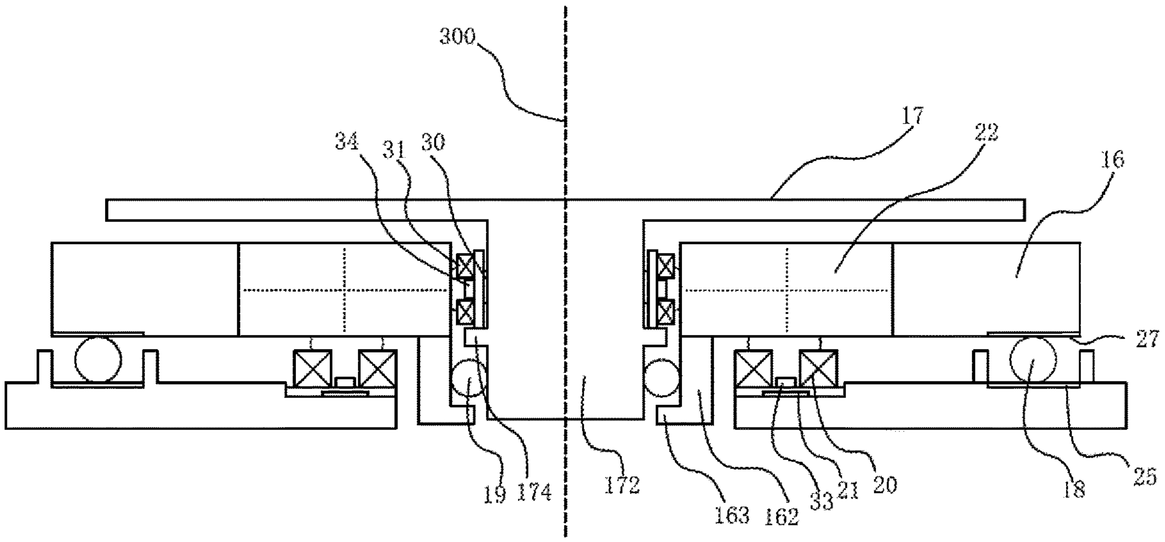
FIG. 18 is a cross-sectional view of a camera device provided according to a second embodiment of the present application.
Figure 19:
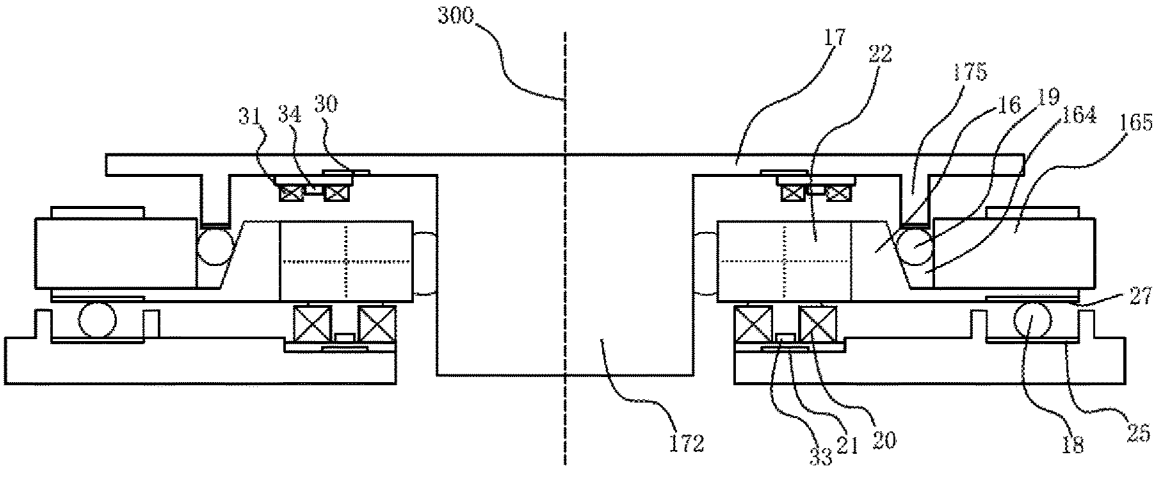
FIG. 19 is a cross-sectional view of a camera device provided according to a third embodiment of the present application.

As shown in FIG. 18, unlike the first embodiment, multiple first magnets 22 are arranged in the circumferential direction of the first through groove 161, and the first movable frame 16 forms a cylinder 162 on the backlight side along the optical axis 300. The inner wall surface of the cylinder 162 is flush with the outer wall surface of the first annular protrusion 172, and a first position-limiting ring 163 protrudes towards the first annular protrusion 172 on the inner wall surface of the cylinder 162.

A second position-limiting ring 174 protrudes from the outer wall surface of the first annular protrusion 172 towards the cylinder 162.

The second ball 19 is arranged between the first position-limiting ring 163 and the second position-limiting ring 174. A side of each respective second ball 19 close to the cylinder 162 is in a rolling connection to the inner wall of the cylinder 162, and a side of each respective second ball 19 close to the first annular protrusion 172 is in a rolling connection to the outer wall of the first annular protrusion 172.

The second coil 31 and the second yoke 30 are both arranged on the outer wall surface of the first annular protrusion 172, and the second coil 31 is arranged between the first magnet 22 and the second yoke 30.

In this embodiment, the second ball 19 includes non-magnetic material, and is arranged on the central side of the optical axis 300. The second movable frame 17 is held in the center of the movement direction by attracting the second yoke 30 through the first magnet 22.

The effectiveness of this structure has the same advantages as the first embodiment.

Third Embodiment

In this embodiment, unlike the second embodiment, multiple first magnets 22 are arranged in the circumferential direction of the first through groove 161. The first movable frame 16 is provided with an accommodating groove 164 on the light receiving side along the optical axis 300. The extending direction of the inner wall near the first magnet 22 of the accommodating groove 164 forms a preset angle with the direction of the optical axis 300. A side of the accommodating groove 164 away from the first magnet 22 is provided with a magnetic adsorbing portion 165, which includes magnetic material.

A protrusion block 175 extending along the optical axis 300 towards the first movable frame 16 is arranged on a position on the second movable frame 17 opposite to the accommodating groove 164.

An end of each respective second ball 19 close to the first movable frame 16 extends into the accommodating groove 164 and is in a rolling connection to the first movable frame 16, and an end of each respective second ball 19 close to the second movable frame 17 is in a rolling connection to the protrusion block 175.

The second coil 31 and the second yoke 30 are both arranged on the second movable frame 17, and the second coil 31 is arranged between the first magnet 22 and the second yoke 30.

The first magnetic attracts the magnetic adsorbing portion 165 on the first movable frame 16, and presses each respective second ball 19 onto the inclined plane of the accommodating groove 164 of the first movable frame 16 in a direction orthogonal to the optical axis 300, so that the first magnet 22 attracts the second yoke 30 to press the second movable frame 17 towards the optical axis 300, thereby keeping the second movable frame 17 in the center along the movement direction.

The effectiveness of this structure has the same advantages as the first embodiment.

Figure 20:
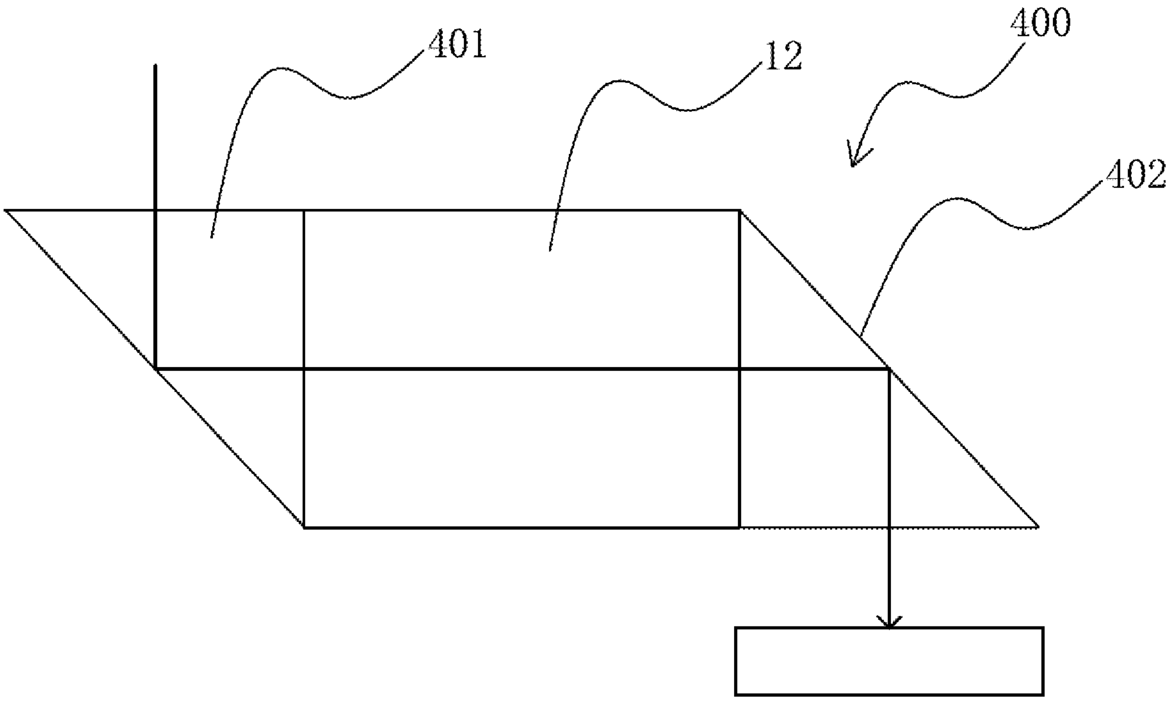
FIG. 20 is a schematic structural view of a periscope lens structure provided according to an embodiment of the present application.

The camera device 100 of the above embodiments is an autofocus lens structure. In some embodiments, as shown in FIG. 20, the above camera device 100 may also be applied to a periscope lens structure 400. The periscope lens structure 400 further includes a first prism 401 arranged on an object side of the lens unit 12 and/or a second prism 402 arranged on an image side of the lens unit 12. The first prism 401 and the second prism 402 are configured to change the direction of the optical path. By setting the first prism 401 and/or the second prism 402 configured to change the direction of the optical path, it is beneficial to reduce the volume of the camera device 100, thereby achieving miniaturization and portability of the camera device 100.

Figure 21:
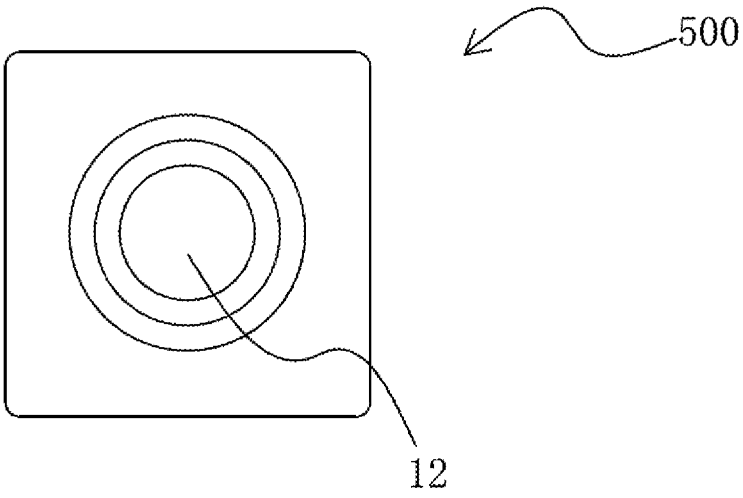
FIG. 21 is a schematic structural view of a zoom lens structure provided according to an embodiment of the present application.
Figure 22:
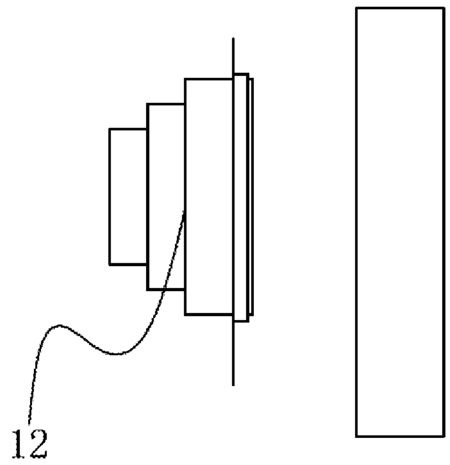
FIG. 22 is a schematic structural view of a zoom lens structure provided according to an embodiment of the present application from another perspective.

As shown in FIG. 21 and FIG. 22, the above camera device 100 may also be applied to a zoom lens structure 500. The lens unit 12 includes at least two lenses spaced along the optical axis 300. The zoom lens structure 500 can change a distance between two lenses along the optical axis 300. Specifically, the lens unit 12 including multiple lenses can perform telescopic motion. By setting the zoom lens structure 500, it is not only beneficial to improve the shooting effect of the camera device 100, but also to enhance the user experience.

Figure 23:
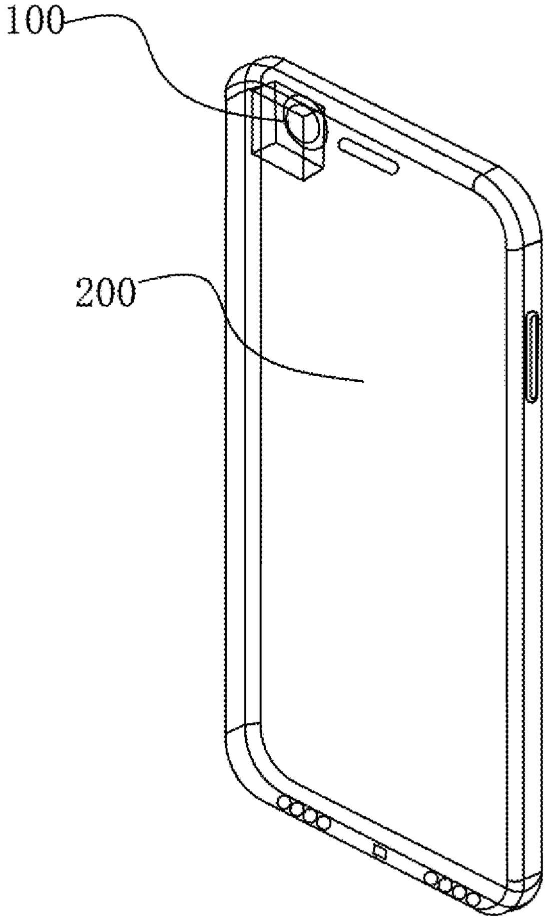
FIG. 23 is a three-dimensional view of a portable electronic device provided according to an embodiment of the present application.

Based on the above embodiment and referring to FIG. 23, a portable electronic device 200 is further provided according to the present application, such as a smart phone or a tablet device, which includes the above camera device 100.

The above embodiments based on the schematic diagram provide a detailed explanation of the structure, features, and effects of the present application. The above are only preferred embodiments of the present application, but the scope of embodiment is not limited by the accompanying drawings. Any changes made according to the concept of the present application, or equivalent embodiments modified to equivalent changes, that do not exceed the spirit covered by the instructions and illustrations, shall fall within the scope of protection of the present application.

What is claimed is:

1. A camera device, comprising a casing having an accommodating cavity, a base fixed to the casing, a lens unit having an optical axis and fixed to the casing, and a camera element unit arranged in the casing, a first movable frame, a second movable frame, a plurality of first balls, a plurality of second balls, a first drive mechanism, and a second drive mechanism;

wherein a first through groove is formed on the first movable frame along the optical axis, and the first movable frame is supported on the base by the plurality of first balls;

wherein the second movable frame is supported on the first movable frame by the plurality of second balls, and a second through groove is formed on the second movable frame along the optical axis, a first annular protrusion protruding from an inner wall of the second through groove is formed at a backlight side along the optical axis, the first annular protrusion extends at least partially into the first through groove, and the camera element unit is fixed to the first annular protrusion and arranged opposite to the second through groove along the optical axis;

wherein the first drive mechanism is configured to drive the first movable frame to move to enable the second movable frame and the camera element unit to rotate along the optical axis as a centerline and/or move in a plane perpendicular to the optical axis, and the second drive mechanism is configured to drive the second movable frame to move to enable the camera element unit to move along the optical axis and/or deflect along a direction perpendicular to the optical axis;

wherein there are a plurality of first shock absorbers between the first movable frame and the base, and plurality of first shock absorbers are arranged at intervals in a circle on the base;

wherein there are a plurality of second shock absorbers arranged between an outer wall surface of the first annular protrusion and an inner wall surface of the first through groove, and the plurality of second shock absorbers are arranged at intervals in a circle within the first through groove.

2. The camera device according to claim 1, wherein the first drive mechanism includes a first magnet fixed on the first movable frame and a first coil arranged on the base and opposite to the first magnet, the second drive mechanism includes a second coil arranged on the second movable frame and opposite to the first magnet, there are a plurality of first magnets, a plurality of first coils, a plurality of second coils, and the plurality of first magnets are in a one-to-one correspondence to the plurality of first coils and the plurality of second coils.

3. The camera device according to claim 2, wherein the first drive mechanism further includes a plurality of first yokes and a first circuit board arranged on the base, the plurality of first coils and the plurality of first yokes are both arranged on the first circuit board, and the plurality of first coils are in a one-to-one correspondence to the plurality of first yokes;

wherein the second drive mechanism further includes a plurality of second yokes and a second circuit board arranged on the second movable frame, the second coil and the plurality of second yokes are both arranged on the second circuit board, and the plurality of second coils are in a one-to-one correspondence to the plurality of second yokes.

4. The camera device according to claim 3, wherein the plurality of first coils includes four first coils symmetrically distributed with the optical axis as a centerline, and two adjacent first coils are arranged orthogonally to each other;

wherein the plurality of second coils includes four second coils symmetrically distributed with the optical axis as a centerline, and two adjacent second coils are arranged orthogonally to each other.

5. The camera device according to claim 2, wherein both the plurality of first coils and the plurality of second coils are runway shaped coils, and the camera device further includes a position sensor arranged within the plurality of first coils and the plurality of second coils.

6. The camera device according to claim 1, wherein the second movable frame has a plurality of guide grooves at the backlight side along the optical axis, extended angle of a respective guide groove in the plurality of guide grooves forms a preset angle with a plane perpendicular to the optical axis, the plurality of guide grooves are in a one-to-one correspondence to the plurality of second balls, an end of each respective of second ball close to the second movable frame extends into the respective guide groove in the plurality of guide grooves and is in a rolling connection to the second movable frame, and an end of each respective of second ball close to the first movable frame is a rolling connection to the first movable frame.

7. The camera device according to claim 6, wherein the second ball includes magnetic material.

8. The camera device according to claim 1, wherein the base is provided with a first groove on a light receiving side along the optical axis, the first movable frame is provided with a second groove on the backlight side along the optical axis, the first groove has a first plate body, the second groove has a second plate body, and the plurality of first balls are at least partially accommodated in the first groove and arranged between the first plate body and the second plate body.

9. The camera device according to claim 1, wherein a flexible conductive substrate is arranged in the accommodating cavity, the flexible conductive substrate is a plate structure with at least two bends or a plate spring shaped structure that can be driven in a plane perpendicular to the optical axis, the accommodating cavity has space for curved surfaces of the flexible conductive substrate to pass, one end of the flexible conductive substrate is connected to the camera element unit, and the other end of the flexible conductive substrate is fixed to the base and at least partially extends outside the accommodating cavity.

10. The camera device according to claim 1, wherein the camera element unit includes an optical filter and an image sensor arranged sequentially along a light incident direction, both the optical filter and the image sensor are fixed in a mounting base, and the mounting base is integrally formed with the second movable frame.

11. The camera device according to claim 1, wherein the first movable frame is configured to extend at the backlight side along the optical axis to form a cylinder, the cylinder has an inner wall surface flushed with the outer wall surface of the first annular protrusion, and a first position-limiting ring protrudes from the inner wall surface of the cylinder to the first annular protrusion;

wherein the outer wall surface of the first annular protrusion is provided with a second position-limiting ring protruding to the cylinder;

wherein the plurality of second balls are movably arranged between the first position-limiting ring and the second position-limiting ring, and are in a rolling connection to the inner wall surface of the cylinder and the outer wall surface of the first annular protrusion.

12. The camera device according to claim 1, wherein the first movable frame has an accommodating groove at a light receiving side along the optical axis, a predetermined angle is formed between an extending direction of an inner wall surface on one side of the accommodating groove and the optical axis, the second movable frame has a protrusion block formed opposite to the accommodating groove, and the protrusion block extends along the optical axis to the first movable frame;

an end of each respective second ball in the plurality of second balls close to the first movable frame is configured to extend into the accommodating groove and is in a rolling connection to the first movable frame, and an end of each respective second ball in the plurality of second balls close to the second movable frame is in a rolling connection to the protrusion block.

13. The camera device according to claim 1, wherein the lens unit is a zoom lens structure or a periscope lens structure.

14. The camera device according to claim 1, wherein the lens unit further includes an aperture structure configured to optically control an amount of light.

15. A portable electronic device, comprising a camera device according to claim 1.

* * * * *